(12) United States Patent
Kamada (10) Patent No.: US 8,363,182 B2
(45) Date of Patent: Jan. 29, 2013

(54) LIQUID CRYSTAL DISPLAY DEVICE HAVING ILLUMINATION ELEMENT EMITTING COLORS INDEPENDENTLY VIA TIME DIVISION

(75) Inventor: Kentaro Kamada, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 594 days.

(21) Appl. No.: 12/376,618

(22) PCT Filed: Aug. 7, 2007

(86) PCT No.: PCT/JP2007/065430
§ 371 (c)(1),
(2), (4) Date: Apr. 15, 2010

(87) PCT Pub. No.: WO2008/018449
PCT Pub. Date: Feb. 14, 2008

(65) Prior Publication Data
US 2010/0201919 A1  Aug. 12, 2010

(30) Foreign Application Priority Data
Aug. 9, 2006 (JP) .................................. 2006-216486

(51) Int. Cl.
*G02F 1/1335* (2006.01)
(52) U.S. Cl. ............................ 349/68; 349/106; 349/108
(58) Field of Classification Search .................. 349/68, 349/106, 108
See application file for complete search history.

(56) References Cited

U.S. PATENT DOCUMENTS

| 6,911,963 B2 * | 6/2005 | Baba et al. ........................ 345/88 |
| 7,042,527 B2 * | 5/2006 | Imai ................................ 348/742 |
| 7,248,244 B2 * | 7/2007 | Akiyama ......................... 345/102 |
| 7,333,165 B2 * | 2/2008 | Nakano et al. ................... 349/68 |
| 2003/0174106 A1 | 9/2003 | Tanada et al. |

FOREIGN PATENT DOCUMENTS

| JP | 10-186311 | | 7/1998 |
| JP | 2003-076342 | | 3/2003 |
| JP | 2003076342 A | * | 3/2003 |
| JP | 2005-070421 | | 3/2005 |

OTHER PUBLICATIONS

International Search Report for PCT/JP2007/065430, mailed Nov. 6, 2007.

* cited by examiner

*Primary Examiner* — Mike Qi
(74) *Attorney, Agent, or Firm* — Nixon & Vanderhye P.C.

(57) ABSTRACT

The color gamut of a liquid crystal display device of the field sequential system is sufficiently improved.
A liquid crystal display device according to the present invention is a liquid crystal display device of the field sequential system including: an illumination element including a first light source for emitting light of a first color, a second light source for emitting light of a second color which is different from the first color, and a third light source for emitting light of a third color which is different from the first and second colors, the illumination element being capable of emitting light of the first, second, and third colors independently by time division; and a liquid crystal display panel for modulating the light emitted from the illumination element. The liquid crystal display panel of the liquid crystal display device according to the present invention includes a first color filter exhibiting a high transmittance for light of the first color.

13 Claims, 6 Drawing Sheets

LIQUID CRYSTAL DISPLAY DEVICE HAVING ILLUMINATION ELEMENT EMITTING COLORS INDEPENDENTLY VIA TIME DIVISION

This application is the U.S. national phase of International application No. PCT/JP2007/065430, filed 7 Aug. 2007, which designated the U.S. and claims priority to Japanese Patent Application No. 2006-216486, filed 9 Aug. 2006, the entire contents of each of which are hereby incorporated by reference.

TECHNICAL FIELD

The present invention relates to a liquid crystal display device, and more particularly to a liquid crystal display device of the field sequential system.

BACKGROUND ART

Currently, liquid crystal display devices are used for various purposes. As a system for realizing color displaying by a liquid crystal display device, the color filter system is most commonly used. In the color filter system, a pixel is constituted by a plurality of subpixels (also referred to as "picture elements"), such that a color filter of a primary color is provided for each subpixel. Typically, three subpixels having red, green, and blue color filters provided therein compose one pixel (also referred to as a "color display pixel"), and color displaying is realized by controlling the transmittance of light for each subpixel.

On the other hand, as a method for realizing color displaying, the field sequential system is also known (see Patent Document 1, for example). In the field sequential system, the colors of light which is emitted from a backlight are switched from one another over time, e.g., red, green, blue, red, green, blue, . . . , and the light transmittance of each pixel of a liquid crystal display panel (which corresponds to a subpixel of the color filter system) is changed in synchronization therewith, whereby the colors are mixed over time by utilizing a persistence-of-vision effect of the retina, thus realizing color displaying. Since the field sequential system is able to perform color displaying with one subpixel, high-resolution display is made possible. Moreover, since there is no need to use color filters, bright display becomes possible.

[Patent Document 1] Japanese Laid-Open Patent Publication No. 10-186311

DISCLOSURE OF INVENTION

Problems to be Solved by the Invention

However, in recent years, liquid crystal display devices are required to have further improved color gamuts. It cannot be said that a sufficient color gamut is obtained with either the color filter system or the field sequential system.

The present invention has been made in view of the aforementioned problems, and an objective thereof is to sufficiently improve the color gamut of a liquid crystal display device of the field sequential system.

Means for Solving the Problems

A display device according to the present invention is a liquid crystal display device of a field sequential system, comprising: an illumination element used as a backlight for the display device and including a first light source for emitting light of a first color, a second light source for emitting light of a second color which is different from the first color, and a third light source for emitting light of a third color which is different from the first and second colors, the illumination element being capable of emitting light of the first, second, and third colors independently by time division; and a liquid crystal display panel for modulating the light emitted from the illumination element, characterized in that the liquid crystal display panel includes a first color filter exhibiting a high transmittance for light of the first color.

In one embodiment, the light of the first color mainly has a spectrum in a green wavelength region, the light of the second color mainly has a spectrum in a blue wavelength region, and the light of the third color mainly has a spectrum in a red wavelength region.

In one embodiment, the first light source is a green light-emitting diode, the second light source is a blue light-emitting diode, and the third light source is a red light-emitting diode.

In one embodiment, the first, second, and third light sources are cold-cathode tubes or hot-cathode tubes.

In one embodiment, a plurality of said first light sources, a plurality of said second light sources, and a plurality of said third light sources are comprised.

In one embodiment, the light of the first color mainly has a spectrum in a green wavelength region, and the liquid crystal display panel includes no color filters other than the first color filter.

In one embodiment, the liquid crystal display panel includes a plurality of pixels arranged in a matrix array; and a said first color filter is provided for each of the plurality of pixels.

In one embodiment, in each of the plurality of pixels, the proportion of an area occupied by the first color filter is greater than ⅓.

In one embodiment, the liquid crystal display panel further includes second color filters exhibiting a high transmittance for light of the second color and third color filters exhibiting a high transmittance for light of the third color, such that a said second color filter and a said third color filter are provided for each of the plurality of pixels.

In one embodiment, each of the plurality of pixels takes one displaying state for one display signal.

In one embodiment, each of the plurality of pixels includes a plurality of subpixels each taking one displaying state for one display signal, the plurality of subpixels including a first subpixel in which the first color filter is provided, a second subpixel in which the second color filter is provided, and a third subpixel in which the third color filter is provided.

In one embodiment, a black display signal is supplied to the second and third subpixels in a period during which a predetermined display signal is being supplied to the first subpixel.

In one embodiment, a black display signal is supplied to the first subpixel in a period during which a predetermined display signal is being supplied to the first and second subpixels.

Effects of the Invention

A liquid crystal display device according to the present invention is a liquid crystal display device of the field sequential system, including an illumination element capable of emitting light of a plurality of colors independently by time division and a liquid crystal display panel for modulating the light emitted from the illumination element. The liquid crystal display panel of the liquid crystal display device according to the present invention includes a color filter which exhibits a high transmittance for light of a specific color, whereby the color reproducibility is improved. That is, an emission spectrum of the illumination element and an absorption spectrum of the color filter allow the color purity of the specific color to be improved, whereby an improved color gamut is obtained.

DESCRIPTION OF REFERENCE NUMERALS 10 illumination element (backlight)
11R red LED
11G green LED
11B blue LED
20, 50 liquid crystal display panel
21, 22 substrate
23 liquid crystal layer
24R red color filter
24G green color filter
24B blue color filter
100, 200, 300, 400, 500 liquid crystal display device

BEST MODE FOR CARRYING OUT THE INVENTION

Hereinafter, an embodiment of the present invention will be described with reference to the drawings. Note that the present invention is not limited to the following embodiment.

Figure 1:
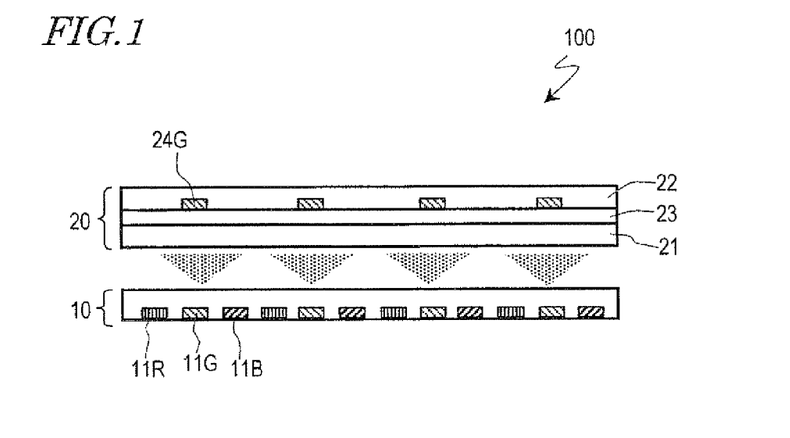
FIG. 1 A cross-sectional view schematically showing a liquid crystal display device 100 according to a preferred embodiment of the present invention.

FIG. 1 schematically shows a liquid crystal display device 100 according to the present embodiment. As shown in FIG. 1, the liquid crystal display device 100 is a liquid crystal display device of the field sequential system, including an illumination element (backlight) 10 and a liquid crystal display panel 20.

The illumination element 10 is able to emit light of a plurality of colors at least including green, while switching them from one another. In the present embodiment, the illumination element 10 includes a red LED 11R which emits red light, a green LED 11G which emits green light, and a blue LED 11B which emits blue light. By generating light while sequentially switching them, the illumination element 10 is able to emit red, green, and blue light while switching between them. In other words, the illumination element 10 is capable of independently emitting red, green, and blue light by time division. Note that, although FIG. 1 illustrates the illumination element 10 of a direct type, the illumination element 10 may be of the edge-light system which employs LEDs and a light guide plate in combination.

The liquid crystal display panel 20 includes a plurality of pixels which are arranged in a matrix array, and is able to modulate light which is emitted from the illumination element 10 pixel by pixel. The liquid crystal display panel 20 includes a pair of substrates 21 and 22, and a liquid crystal layer 23 provided between the substrates 21 and 22. Since displaying is performed based on the field sequential system in the present embodiment, is preferable to use a liquid crystal layer 23 having a fast response speed. As used herein, a "pixel" refers to a minimum unit ("color display pixel") that is capable of color displaying. In the liquid crystal display device of the present embodiment, each pixel performs displaying of red, green, and blue by time division. Therefore, the smallest constituent element whose transmittance of light is independently controlled by a display signal corresponds to a pixel. For example, in the case of a TFT type display device, each unit that is defined by a pixel electrode to which a display signal is supplied from a data signal line via a TFT and a counter electrode which opposes the pixel electrode via a liquid crystal layer corresponds to a pixel, such that the pixel takes one displaying state for one display signal.

As shown in FIG. 1, the liquid crystal display panel 20 in the present embodiment includes green color filters (hereinafter referred to as "green color filters") 24G. Specifically, a green color filter 24G is provided in each pixel so as to occupy a partial region in the pixel, e.g., so as to occupy an area which is about ⅓ or more of the pixel (aperture). Since each pixel of the liquid crystal display panel 20 is to display not only green but also red and blue by time division, it is necessary that at least about ⅓ of the pixel (aperture) is a region where the green color filter does not exist. FIG. 1 illustrates the green color filters 24G as being formed on the substrate 22 that is disposed on the viewer's side between the pair of substrates 21 and 22; however, the green color filters 24G may be formed on the substrate 21 that is disposed on the illumination element 10 side.

In a conventional liquid crystal display device of the field sequential system, no color filters are provided on the liquid crystal display panel. On the other hand, in the liquid crystal display device 100 of the present embodiment, despite the fact that the field sequential system is adopted, the green color filters 24G are provided on the liquid crystal display panel 20. Moreover, unlike in a conventional liquid crystal display device of the color filter system, no color filters other than the green color filters 24G are provided.

By thus providing the green color filters 24G on the liquid crystal display panel 20, it is possible to sufficiently broaden the color gamut. Hereinafter, the reason thereof will be described.

Figure 2:
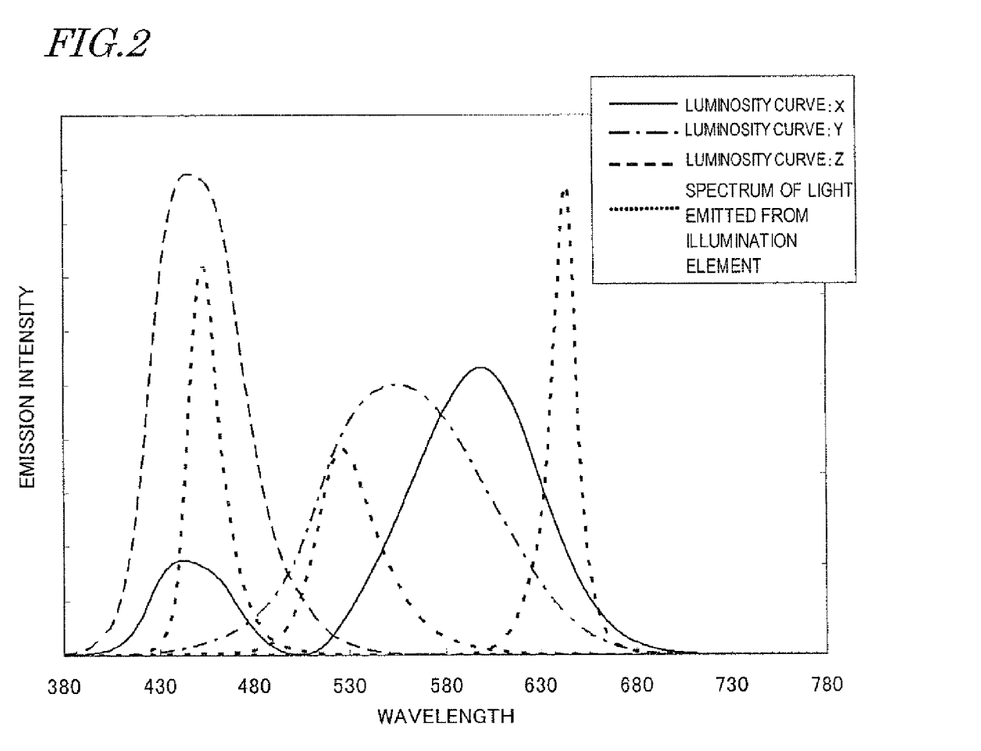
FIG. 2 A graph showing a spectrum of light which is emitted from an illumination element and luminosity curves.

FIG. 2 shows a relationship between the spectrum of light which is emitted from the illumination element 10 and luminosity curves X, Y, and Z. The luminosity curves X, Y, Z are curves representing the sensitivity characteristics of the human eye with respect to light of various wavelengths.

As shown in FIG. 2, within the light which is emitted from the illumination element 10, the green light spectrum (spectrum having a peak near 520 nm) overlaps not only the luminosity curve Y for green, but also the luminosity curve X for red and the luminosity curve Z for blue. This means that the color purity of green is more susceptible to the influences of the shape (especially half-width) of the emission spectrum than the color purity of any other color. Therefore, by adjusting the shape of the green light spectrum with the green color filters 24G provided on the liquid crystal display panel 20, it is possible to enhance the color purity of green, thereby broadening the color gamut.

Figure 3:
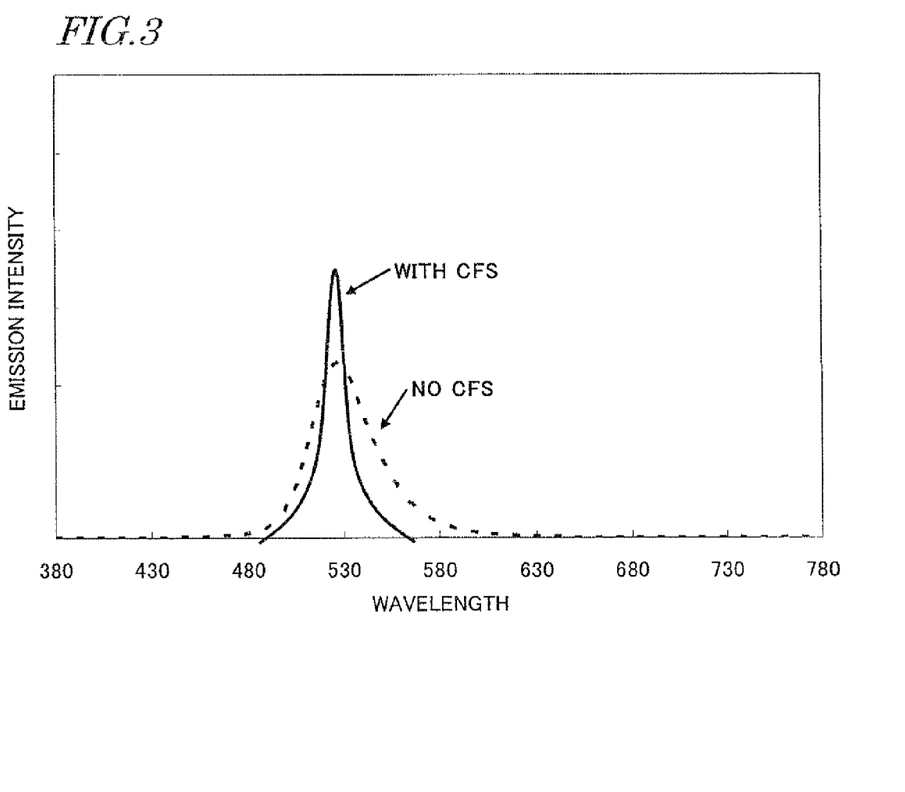
FIG. 3 A graph showing a spectrum of green light which is emitted from an illumination element and a spectrum of green light which has passed through green color filters.

FIG. 3 shows a spectrum of green light which is emitted from the illumination element 10 (the "no CFs" dotted line) as well as a spectrum of green light which has passed through the green color filters 24 (the "with CFs" solid line). As shown in FIG. 3, by providing the green color filters 24G, the half-width of the green light spectrum is narrowed, whereby the color purity of green is enhanced. Therefore, by providing the green color filters 24G, it is possible to broaden the color gamut.

Note that, also with respect to red and blue, it is possible to adjust the shapes of the red light and blue light spectra with red color filters and blue color filters (hereinafter respectively referred to as "red color filters" and "blue color filters"), thus enhancing the color purity. Therefore, as in the liquid crystal display device 200 shown in FIG. 4, not only the green color filters 24G, but also red color filters 24R and blue color filters 24B may be further provided on the liquid crystal display panel 20.

Figure 5:
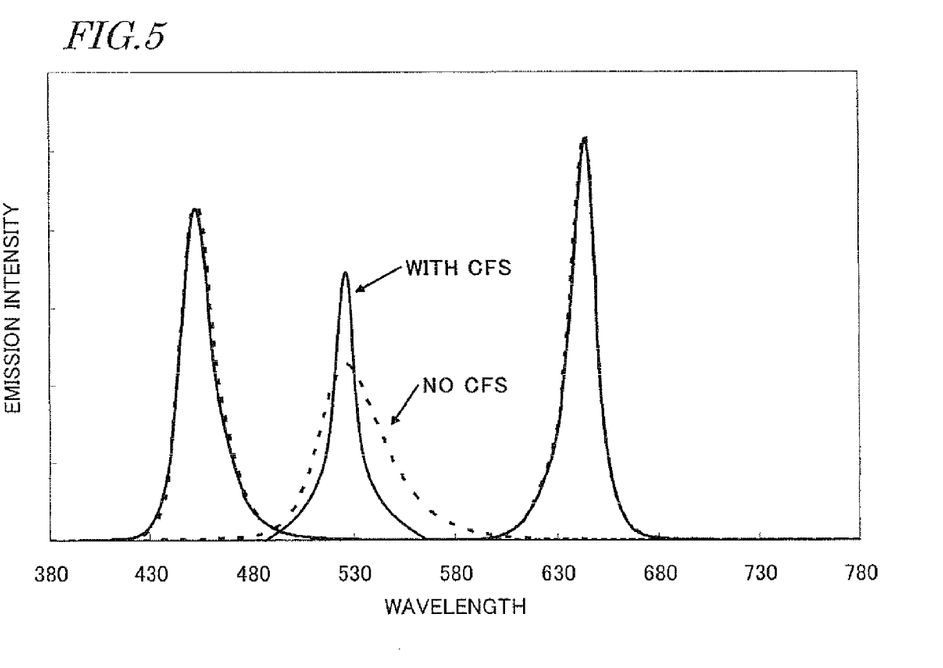
FIG. 5 A graph showing, with respect to all colors of red, green, and blue, a spectrum of light which is emitted from an illumination element and a spectrum of light which has passed through color filters.

However, according to studies by the inventor, the effect of color purity improvement is greater in the case where the green color filters 24G are provided than in the case where the red color filters 24R or the blue color filters 24B are provided. FIG. 5 shows, with respect to all colors of red, green, and blue, a spectrum of light which is emitted from the illumination element 10 (the "no CFs" dotted line) and a spectrum of light which has passed through the color filters (the "with CFs" solid line).

As shown in FIG. 5, the spectrum shape of green light greatly changes depending on the presence or absence of the green color filters 24G, whereas the spectrum shapes of red light and blue light hardly change, irrespective of the presence or absence of the red color filters 24R and the blue color filters 24B.

Thus, the effect of color purity improvement due to provision of color filters is greatest with respect to green. Therefore, a sufficient broadening of the color gamut can be attained by providing at least the green color filters 24G on the liquid crystal display panel 20. Since provision of the color filters in itself lowers the efficiency of light utility, providing only the green color filters 24G on the liquid crystal display panel 20 and not providing color filters of other colors will make it possible to broaden the color gamut while not much lowering the efficiency of light utility. Moreover, through time division, color displaying is performed by each pixel, which is the smallest constituent element whose transmittance of light is independently controlled by a display signal. Therefore, the liquid crystal display device of the present embodiment has a higher resolution than those of conventional color filter systems (where a plurality of subpixels compose a pixel), which is a characteristic of the field sequential system.

Figure 6:
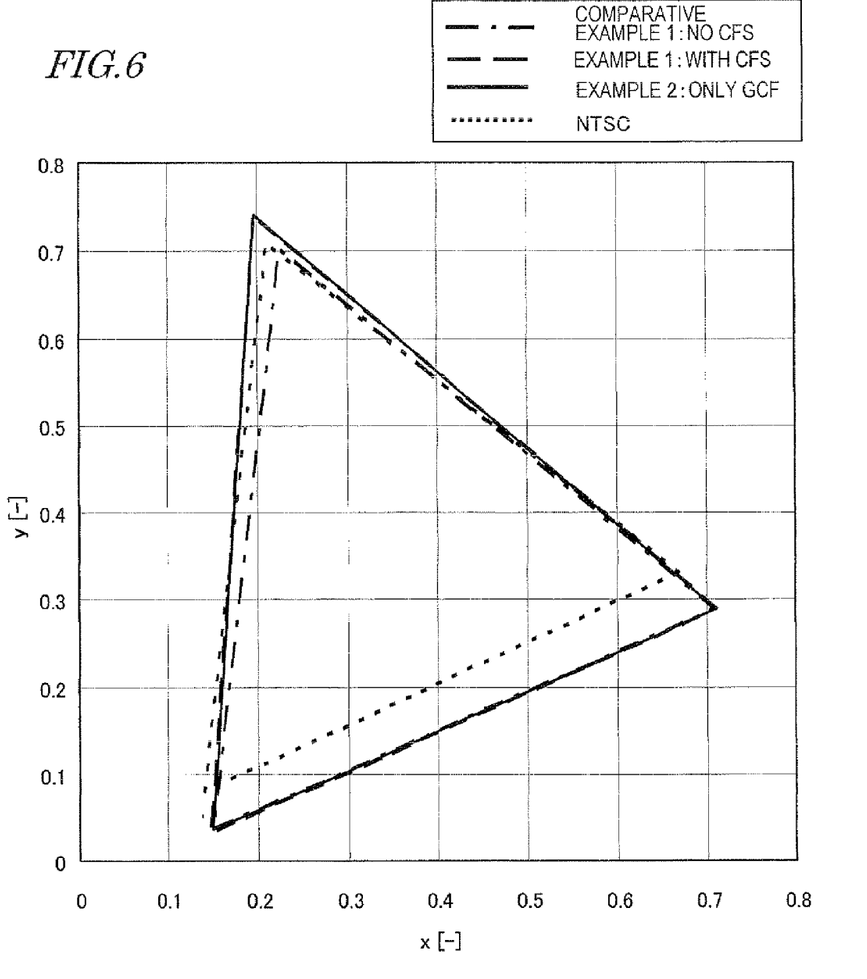
FIG. 6 A chromaticity diagram showing a color gamut of each of the liquid crystal display devices of Examples 1 and 2 and Comparative Example and a color gamut defined by the NTSC.

Table 1 and FIG. 6 show simulation results of the effect of color gamut broadening according to the present invention. Table 1 is a table showing chromaticities (x,y) for red, green, blue and white displayed by each of the liquid crystal display devices of Examples 1 and 2 and Comparative Examples 1 to 3 (all of which perform displaying based on the field sequential system), as well as their color gamuts (NTSC ratio and Adobe RGB ratio). Moreover, FIG. 6 is a chromaticity diagram showing a color gamut of each of the liquid crystal display devices of Examples 1 and 2 and Comparative Example 1, and a color gamut defined by the NTSC. In all cases, each color filter has an area which is about ⅓ of the pixel (aperture).

TABLE 1

|  |  | Comparative Example 1 | Example 1 | Example 2 | Comparative Example 2 | Comparative Example 3 |
|---|---|---|---|---|---|---|
| CF arrangement |  | no CFs | with CFs | only GCF | only RCF | only BCF |
| R | x | 0.7099 | 0.7119 | 0.7099 | 0.7119 | 0.7099 |
|  | y | 0.2891 | 0.2881 | 0.2891 | 0.2881 | 0.2891 |
| G | x | 0.2243 | 0.1968 | 0.1968 | 0.2243 | 0.2243 |
|  | y | 0.7032 | 0.7403 | 0.7403 | 0.7032 | 0.7032 |
| B | x | 0.1510 | 0.1479 | 0.1510 | 0.1510 | 0.1479 |
|  | y | 0.0362 | 0.0315 | 0.0362 | 0.0362 | 0.0315 |
| W | x | 0.2724 | 0.2718 | 0.2731 | 0.2722 | 0.2719 |
|  | y | 0.2782 | 0.2776 | 0.2769 | 0.2782 | 0.2781 |
| NTSC ratio |  | 112.0% | 122.4% | 120.7% | 112.4% | 113.1% |
| Adobe RGB ratio |  | 117.2% | 128.1% | 126.3% | 117.7% | 118.4% |

Firstly, it can be seen from Table 1 and FIG. 6 that the color gamut is greatly broadened in Example 1 where red color filters, green color filters, and blue color filters are provided on the liquid crystal display panel, than in Comparative Example 1 where no color filters are provided on the liquid crystal display panel.

It can also be seen that in Example 2 where only green color filters are provided on the liquid crystal display panel, the color gamut is greatly improved as compared to Comparative Example 2 where only red color filters are provided and Comparative Example 3 where only blue color filter are provided, and that substantially the same level of color gamut as that of Example 1 is realized.

As described above, by providing at least green color filters on the liquid crystal display panel, the color gamut of a liquid crystal display device of the field sequential system can be sufficiently improved. In particular, by only providing green color filters, it becomes possible to effectively (without allowing the efficiency of light utility to be much degraded) broaden the color gamut.

Figure 4:
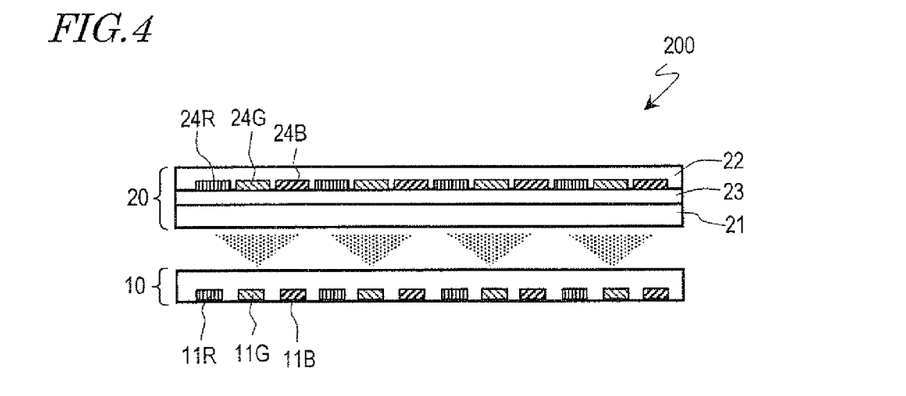
FIG. 4 A cross-sectional view schematically showing a liquid crystal display device 200 according to a preferred embodiment of the present invention.
Figure 7:
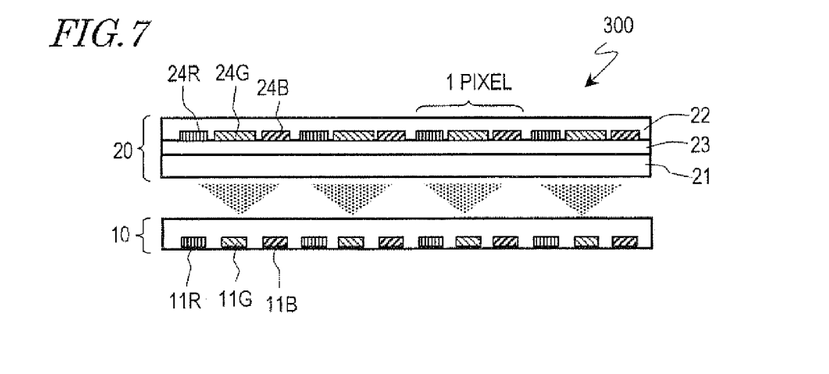
FIG. 7 A cross-sectional view schematically showing a liquid crystal display device 300 according to a preferred embodiment of the present invention.
Figure 8:
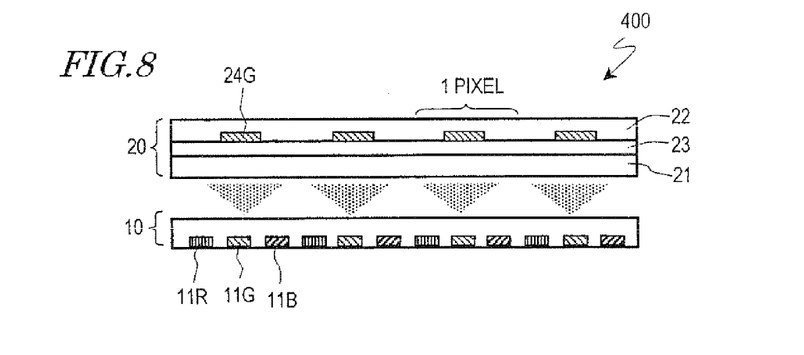
FIG. 8 A cross-sectional view schematically showing a liquid crystal display device 400 according to a preferred embodiment of the present invention.

Although FIG. 4 illustrates an example where the proportion of the area occupied by the green color filter 24G within the pixel is about ⅓, the present invention is not limited thereto. The proportion of the area occupied by the green color filter 24G within the pixel may be smaller than ⅓, or conversely, greater than ⅓ as in a liquid crystal display device 300 shown in FIG. 7 or a liquid crystal display device 400 shown in FIG. 8. In the case where three colors of color filters including green are provided for each pixel, it becomes possible to increase the transmittance (luminance) for green light and realize low power consumption by ensuring that the proportion of the area occupied by the green color filter 24G is greater than ⅓ of the pixel (aperture), because the human eye is most sensitivity to green light.

Next, with reference to FIG. 9, a specific example of a module structure for the liquid crystal display device of the present embodiment will be described.

Figure 9:
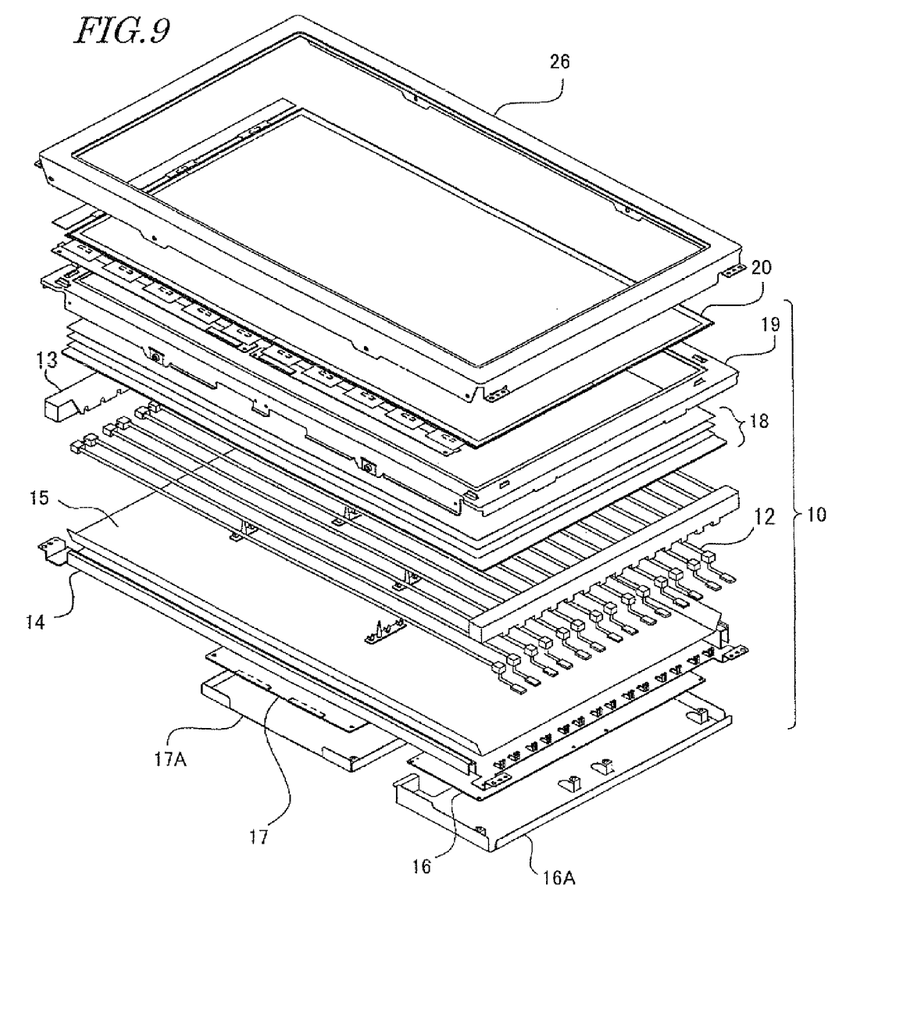
FIG. 9 An exploded perspective view showing an example module structure for a liquid crystal display device according to a preferred embodiment of the present invention.

An illumination element 10 shown in FIG. 9 includes a plurality of fluorescent lamps 12. The fluorescent lamps are retained on a sheet metal 14 by lamp holders 13. Between the fluorescent lamps 12 and the sheet metal 14, a reflection sheet 15 for reflecting the light which is emitted from the fluorescent lamps 12 toward the rear face side is provided. Note that cold-cathode tubes can be suitably used as the fluorescent lamps 12 from the standpoint of power consumption or the like, but it is also possible to use other fluorescent lamps such as hot-cathode tubes.

On the rear side of the sheet metal 14, an inverter substrate 16 and a control substrate 17 are provided. The inverter substrate 16 is covered by an inverter substrate cover 16A, and the control substrate 17 is covered by a control substrate cover 17A.

On the opposite side of the fluorescent lamps 12 from the reflection sheet 15, a plurality of sheets 18 for scattering the light emitted from the fluorescent lamps 12 and controlling its directivity are provided. The sheets 18 are secured by a frame 19 which engages the sheet metal 14. On the frame 19, a liquid crystal display panel 20 is provided and is secured by a bezel 26.

The fluorescent lamps 12 includes a plurality of fluorescent lamps which emit green light, a plurality of fluorescent lamps which emit blue light, and a plurality of fluorescent lamps which emit red light, for example. From the standpoint of uniformity, it is preferable that the fluorescent lamps 12 which emit these three colors of light are provided in a recursive arrangement (i.e., in the order of G,B,R,G,B,R, . . . ). When the fluorescent lamps 12 emitting light of the respective colors are sequentially activated with control signals which are supplied from the control substrate 17, the illumination element 10 independently emits green light, blue light, and red light by time division. Note that use of LEDs would provide an advantage of less burden on the environment because light-emitting diodes (LEDs) generally do not contain mercury, whereas use of fluorescent lamps would provide the advantage of inexpensiveness and high emission efficiency. In both cases of using LEDs and using fluorescent lamps, by placing the light sources emitting different colors of light in a recursive arrangement, an improved luminance uniformity can be obtained. Moreover, a light source is larger than a pixel (or a color filter), generally speaking. Even in the case where LEDs are used, one light source is to be provided with respect to more than a few pixels.

The above embodiment illustrates a liquid crystal display device including an illumination element which has light sources for emitting red, blue, and green light and which is capable of independently emitting light of these colors by time division and a liquid crystal display panel having at least green color filters. However, the kinds of color light are not limited to tie above example. Recently, in order to broaden the color gamut of a liquid crystal display device, multiprimary displaying which combines four or more colors (called "primary colors") is vigorously applied, and multiprimary displaying of four or more colors can also be applied to the liquid crystal display device according to the present invention. For example, cyan (C), magenta (M), and yellow (Y) may sometimes be used in addition to red, blue, and green. However, as is mentioned above, it is green that results in a high color purity improving effect. Therefore, one of the three or more colors of color light is preferably green and green color filters are preferably provided.

Moreover, the relationship between the spectra of color light emitted from the light sources and the absorption spectra of the color filters for enhancing the color purities thereof may be set as appropriate, according to the desired color purities. Typically, it is preferably that, after color light has been transmitted through a corresponding color filter, the central wavelength of the color light is hardly changed but its halfwidth is narrowed, from the standpoint of efficiency of light utility.

Figure 10:
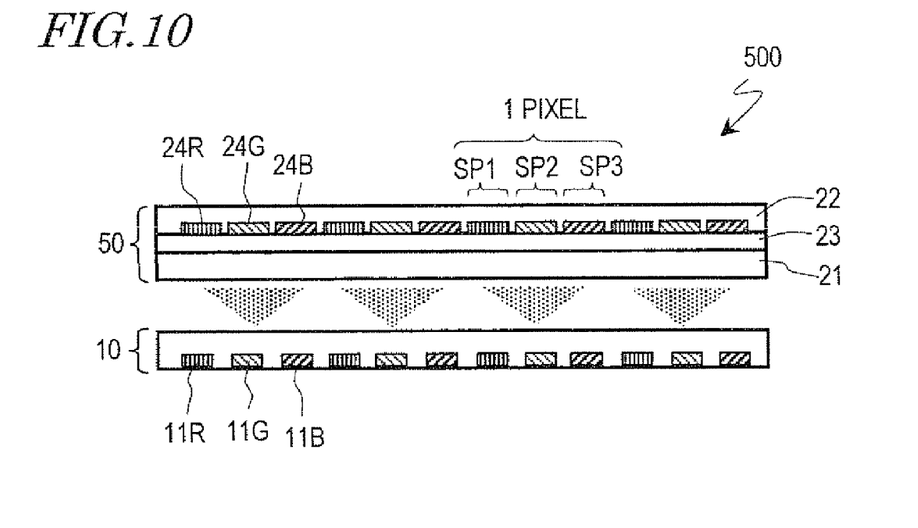
FIG. 10 A cross-sectional view schematically showing a liquid crystal display device 500 according to a preferred embodiment of the present invention.

In all of the liquid crystal display devices 100 to 400 of the above embodiment, the smallest constituent element whose transmittance of light is independently controlled with a display signal is a pixel which is capable of color displaying. However, as in a liquid crystal display device 500 shown in FIG. 10, the smallest constituent element whose transmittance of light is independently controlled with a display signal may be a subpixel, such that three subpixels SP1 to SP3 compose a pixel. Specifically, a liquid crystal display panel 50 included in the liquid crystal display device 500 has a construction which allows transmittance of light to be independently controlled with respect to each of the subpixels SP1 to SP3. In the case of a TFT type liquid crystal display panel, each unit that is defined by a pixel electrode to which a display signal is supplied from a data signal line via a TFT and a counter electrode which opposes the pixel electrode via a liquid crystal layer corresponds to a subpixel, such that each subpixel takes one displaying state for one display signal. Accordingly, the liquid crystal display device 500 has a lower resolution than those of the liquid crystal display devices 100 to 400 of the above embodiment (equal to that of a conventional liquid crystal display device of the color filter system), but the color purity is further enhanced. Specifically, if a black display signal is supplied to the red subpixel SP1 and the blue subpixel SP3 in a period during which a predetermined display signal is being supplied to the green subpixel SP2, the light which is used for green displaying will be only the light that has been transmitted through the green subpixel SP2. Moreover, if a black display signal is supplied to the green subpixel SP2 in a period during which a predetermined display signal is being supplied to the red subpixel SP1 and the blue subpixel SP3, green light is prevented from being mixed in the light which is utilized for red displaying and blue displaying. Of course it would also be possible to adopt a construction where a black display signal is supplied to the green subpixel SP2 and the blue subpixel SP3 in a period during which a predetermined display signal is being supplied to the red subpixel SP1, and where a black display signal is supplied to the green subpixel SP2 and the red subpixel SP1 in a period during which a predetermined display signal is being supplied to the blue subpixel. SP3. Thus, the color purity can be further improved by adopting a construction in which subpixels are provided.

It would also be possible to adopt a construction where one pixel is constituted by two subpixels, with a green color filter being provided for one of the subpixels (green subpixel) and no color filter being provided for the other subpixel (the other subpixel). By adopting a construction where a black display signal is supplied to the other subpixel in a period during which a predetermined display signal is being supplied to the green subpixel, and where a black display signal is supplied to the green subpixel in a period during which red or blue is being displayed in the other subpixel, the color purity can be improved and also the decrease in resolution can be reduced to $2/3$.

The liquid crystal display device according to the present invention is to be field-sequential driven in all of the aforementioned cases. That is, each color light source of the illuminator is selectively activated during a display period which is allocated for each color (typically a period of $1/3$ of one field in the case of 3 primary colors), and in synchronization therewith, a predetermined display signal is supplied to the pixel or the corresponding subpixel. However, depending on the characteristics of the light sources, they may not be activated or deactivated fast enough; in such cases, it is preferable to enhance their color purities adopting a construction including subpixels.

Industrial Applicability

According to the present invention, it is possible to sufficiently improve the color gamut of a liquid crystal display device of the field sequential system. The present invention is broadly applicable to liquid crystal display devices of the field sequential system.

The invention claimed is:

1. A liquid crystal display device of a field sequential system, comprising:

an illumination element used as a backlight for the display device and including a first light source for emitting light of a first color, a second light source for emitting light of a second color which is different from the first color, and a third light source for emitting light of a third color which is different from the first and second colors, the illumination element being capable of emitting light of the first, second, and third colors independently by time division; and a liquid crystal display panel for modulating the light emitted from the illumination element, wherein, the liquid crystal display panel includes a first color filter exhibiting a high transmittance for light of the first color, and wherein the light of the first color mainly has a spectrum in a green wavelength region, and the liquid crystal display panel includes no color filters other than the first color filter.

2. The liquid crystal display device of claim I, wherein the light of the first color mainly has a spectrum in a green wavelength region, the light of the second color mainly has a spectrum in a blue wavelength region, and the light of the third color mainly has a spectrum in a red wavelength region.

3. The liquid crystal display device of claim 1, wherein the first light source is a green light-emitting diode, the second light source is a blue light-emitting diode, and the third light source is a red light-emitting diode.

4. The liquid crystal display device of claim 1, wherein the first, second, and third light sources are cold-cathode tubes or hot-cathode tubes.

5. The liquid crystal display device of claim 1, comprising a plurality of said first light sources, a plurality of said second light sources, and a plurality of said third light sources.

6. A liquid crystal display device of a field sequential system, comprising:

an illumination element used as a backlight for the display device and including a first light source for emitting light of a first color, a second light source for emitting light of a second color which is different from the first color, and a third light source for emitting light of a third color which is different from the first and second colors, the illumination element being capable of emitting light of the first, second, and third colors independently by time division; and a liquid crystal display panel for modulating the light emitted from the illumination element, wherein, the liquid crystal display panel includes a first color filter exhibiting a high transmittance for light of the first color, the liquid crystal display panel includes a plurality of pixels arranged in a matrix array; and a said first color filter is provided for each of the plurality of pixels.

7. The liquid crystal display device of claim 6, wherein the light of the first color mainly has a spectrum in a green wavelength region, and the liquid crystal display panel includes no color filters other than the first color filter.

8. The liquid crystal display device of claim 6, wherein in each of the plurality of pixels, the proportion of an area occupied by the first color filter is greater than $1/3$.

9. The liquid crystal display device of claim 6, wherein the liquid crystal display panel further includes second color filters exhibiting a high transmittance for light of the second color and third color filters exhibiting a high transmittance for light of the third color, such that a said second color filter and a said third color filter are provided for each of the plurality of pixels.

10. The liquid crystal display device of claim 6, wherein each of the plurality of pixels takes one displaying state for one display signal.

11. The liquid crystal display device of claim 6, wherein each of the plurality of pixels includes a plurality of subpixels each taking one displaying state for one display signal, the plurality of subpixels including a first subpixel in which the first color filter is provided, a second subpixel in which the second color filter is provided, and a third subpixel in which the third color filter is provided.

12. The liquid crystal display device of claim 11, wherein a black display signal is supplied to the second and third subpixels in a period during which a predetermined display signal is being supplied to the first subpixel.

13. The liquid crystal display device of claim 11, wherein a black display signal is supplied to the first subpixel in a period during which a predetermined display signal is being supplied to the third and second subpixels.

* * * * *